(12) United States Patent
Burns (10) Patent No.: US 8,195,701 B1
(45) Date of Patent: Jun. 5, 2012

(54) INTEGRATION OF DATA SETS INTO DOCUMENTS FOR INTERACTIVE EXPLORATION

(75) Inventor: John Cameron Burns, Bainbridge Island, WA (US)

(73) Assignee: Ithaka Harbors, Inc., New York, NY (US)

( * ) Notice: Subject to any disclaimer, the term of this patent is extended or adjusted under 35 U.S.C. 154(b) by 159 days.

(21) Appl. No.: 12/420,170

(22) Filed: Apr. 8, 2009

(51) Int. Cl.
*G06F 3/00* (2006.01)
*G06F 17/30* (2006.01)
(52) U.S. Cl. .......................... 707/795; 707/913; 715/751
(58) Field of Classification Search ................. 707/736, 707/795, 913; 715/751
See application file for complete search history.

(56) References Cited

U.S. PATENT DOCUMENTS

| | | | | |
|---|---|---|---|---|
| 6,401,105 | B1 * | 6/2002 | Carlin et al. | 715/210 |
| 6,529,900 | B1 * | 3/2003 | Patterson et al. | 1/1 |
| 6,546,405 | B2 * | 4/2003 | Gupta et al. | 715/233 |
| 6,631,497 | B1 * | 10/2003 | Jamshidi et al. | 715/205 |
| 6,854,026 | B1 * | 2/2005 | Sexton et al. | 710/62 |
| 2002/0099775 | A1 * | 7/2002 | Gupta et al. | 709/205 |
| 2002/0137015 | A1 * | 9/2002 | Guinta et al. | 434/323 |
| 2002/0174049 | A1 * | 11/2002 | Kitahara | 705/36 |
| 2003/0144868 | A1 * | 7/2003 | MacIntyre et al. | 705/1 |
| 2004/0027371 | A1 * | 2/2004 | Jaeger | 345/716 |
| 2004/0133545 | A1 * | 7/2004 | Kiessig et al. | 707/1 |
| 2004/0205547 | A1 * | 10/2004 | Feldt et al. | 715/512 |
| 2005/0234957 | A1 * | 10/2005 | Olson et al. | 707/101 |
| 2006/0036958 | A1 * | 2/2006 | Dreher | 715/764 |
| 2006/0055700 | A1 * | 3/2006 | Niles et al. | 345/473 |

* cited by examiner

*Primary Examiner* — James Trujillo
*Assistant Examiner* — Jorge A Casanova
(74) *Attorney, Agent, or Firm* — Leason Ellis (57) ABSTRACT

A system for interaction with datasets includes a computer having a processor, a memory, and modules with code that executes in the processor. An editor module creates a dataset container file (DCF) in which a location and a structure of one or more datasets is defined and used to select positions for commentary within a presentation of the DCF contents. An import module is operative to import a first dataset from the defined location. An interface module is operative to obtain author-commentary and associate the author-commentary with the first dataset in response to interaction with a user. A synchronization module is operative to coordinate on a display a presentation of a portion of at least one of the datasets defined in the DCF in accordance with a selected position on a timeline. The presentation includes the author-commentary within the timeline. The datasets and the author-commentary are included in the DCF.

21 Claims, 6 Drawing Sheets

| Date | CT | KY |
|---|---|---|
| 1790 | 237,655 | 73677 |
| 1800 | 251,002 | 220,955 |
| 1810 | 261,942 | 406,511 |
| 1820 | 275,248 | 564,317 |
| 1830 | 297,675 | 687,917 |
| 1840 | 310,015 | 779,828 |
| 1850 | 370,792 | 982,405 |
| 1860 | 460,147 | 1,155,684 |
| 1870 | 537,454 | 1,321,011 |
| 1880 | 622,700 | 1,648,690 |
| 1890 | 746,258 | 1,858,635 |
| 1900 | 908,420 | 2,147,174 |
| 1910 | 1,114,756 | 2,289,905 |
| 1920 | 1,380,631 | 2,416,630 |
| 1930 | 1,606,903 | 2,614,589 |
| 1940 | 1,709,242 | 2,845,627 |
| 1950 | 2,007,280 | 2,944,806 |
| 1960 | 2,535,234 | 3,038,156 |

DS1: Total Population of selected States.

| Census Date | CT(F) | KY(F) |
|---|---|---|
| 1880 | 272,184 | 655,336 |
| 1890 | 316,918 | 816,100 |
| 1900 | 376,720 | 915,877 |
| 1910 | 551,114 | 1,128,196 |
| 1920 | 685,296 | 1,189,136 |
| 1930 | 805,600 | 1,291,796 |
| 1940 | 859,319 | 1,409,815 |
| 1950 | 1,018,783 | 1,469,819 |
| 1960 | 1,291,005 | 1,529,708 |

DS2: Female Population of Selected States (1880-1960).

| 1920 | 413858 | 631,613 |
|---|---|---|
| 1930 | 496532 | 704,148 |
| 1940 | 587889 | 812,652 |
| 1950 | 652830 | 787,595 |

DS3: Adult Female Population (Selected States)

INTEGRATION OF DATA SETS INTO DOCUMENTS FOR INTERACTIVE EXPLORATION

FIELD OF THE INVENTION

The present invention relates to systems and tools for dataset management, and, more particularly, to systems that define a portable dataset format for allowing interactive exploration and comment by users.

BACKGROUND OF THE INVENTION

In the general field of research, scholarly works rely on datasets of information to support a thesis or other premise. The dataset is typically a table of values or measurements, and can be represented in a variety of forms at least as great as the number of topics of research. Moreover, the representation of datasets used to illustrate research results varies widely. By way of illustration and not limitation, datasets can be represented by text, images, audio, video, graphs, tables, databases, symbols, and pictures. The process of identifying and collecting objects to include in a dataset, in and of itself, can be a monumental task, yet the dataset itself has often not had an existence outside of the research done by a particular scholar. Consequently, there is great repetition of work in gathering information to construct or reconstruct datasets. There is also great dispersion in the results and opinions offered by scholars, in part, because the datasets being relied upon for such opinions are not the same and are not all of the same quality.

Microsoft Access and Excel are two popular software programs that support the storage of datasets. These programs can include embedded reports and provide some visualization of the datasets that they contain. However, these programs primarily store datasets rather than providing a mechanism to document such datasets in the first place.

Sophie™ and Adobe® Acrobat® are two known software-based systems that allow certain, limited types of media objects to be embedded into a file, but neither of these systems or any systems known to the inventor allow for a dataset to be included into a document nor do they permit the user to connect the dataset to visualization mechanisms and so explore the dataset that underlies the context of the media being contained. Although Adobe Macromedia Flash, in principle, allows for timelines and other visualization mechanisms, that environment is primarily a programming system and does not allow for embedded datasets or for so-called "drag-n-drop" synchronization.

There is a need in the art for systems that make underlying datasets more accessible to scholars and other persons. In part, a published dataset in and of itself would provide a basis for a new form of scholarship. To be respected by peers and favorably reviewed, a dataset must be thorough. In turn that may require that the dataset combine multiple data objects of varying type, such as the types noted above. The present invention provides a system and tools that are operative to permit scholars, researchers, co-workers, students, and people in general to extend a dataset through commentary and interpretation provided through a system, preferably constructed using software, that synchronizes elements in the dataset and enables visualization of the elements in a well-defined context.

SUMMARY OF THE INVENTION

In accordance with a broad aspect of the invention, a system for interaction with datasets in support of scholarly and other commentary includes a computer having a processor and a memory as well as a set of modules each comprising code that executes in the processor. The code in the modules can comprise software. An editor module creates a dataset container file (DCF) in which a location and a structure of one or more datasets is input and which is used to select positions for commentary within a presentation of the DCF contents. An import module is operative to import a first dataset from the defined location. An interface module is operative to obtain author-commentary and associate the author-commentary with the first dataset in response to interaction with a user. A synchronization module is operative to coordinate on a display a presentation of a portion of at least one of the datasets defined in the DCF in accordance with a selected position on a timeline. The presentation includes the author-commentary within the timeline. The datasets and the author-commentary are included in the DCF.

This and other aspects, features and advantages of the disclosed system can be appreciated from the accompanying description of Certain Embodiments of the Invention and the Drawing Figures.

DETAILED DESCRIPTION OF CERTAIN EMBODIMENTS OF THE INVENTION

By way of overview and introduction, a dataset of media in multiple formats is embedded into a container and metadata is associated with the dataset in order to synchronize one or more views of the data such as audio, video, and timed explanations and presentation of data in the dataset container file (DCF). The creation software looks and feels like a word processing or similar editor, yet it generates the DCF, preferably together with code that permits its interpretation. On the other hand, the DCF can be passed as a single file to a program that can interpret the DCF, such as a web browser program, for purposes of viewing or editing. The invention can be built upon a variety of multi-media editors; the invention is not restricted to any particular implementation platform. Thus, it can be an extension of existing systems or it can be a stand-alone system as presently contemplated.

The term "dataset" as used in this Specification refers to a table of related information some of which is quantitative or enumerated information. The quantitative relationship distinguishes a dataset from a log or journal of text information. The elements of a dataset are arranged in a consistent manner, such as in a table with columns of data and with each row representing a particular item. Each column will have a consistent data type such as dates, numbers, or enumerations. Enumerations and enumerated data refer to data that is drawn from a finite set of possible values (e.g. the colors of the rainbow or the names of the Greek gods). Each row defines a record. There is no requirement that all elements be present.

Figure 1:
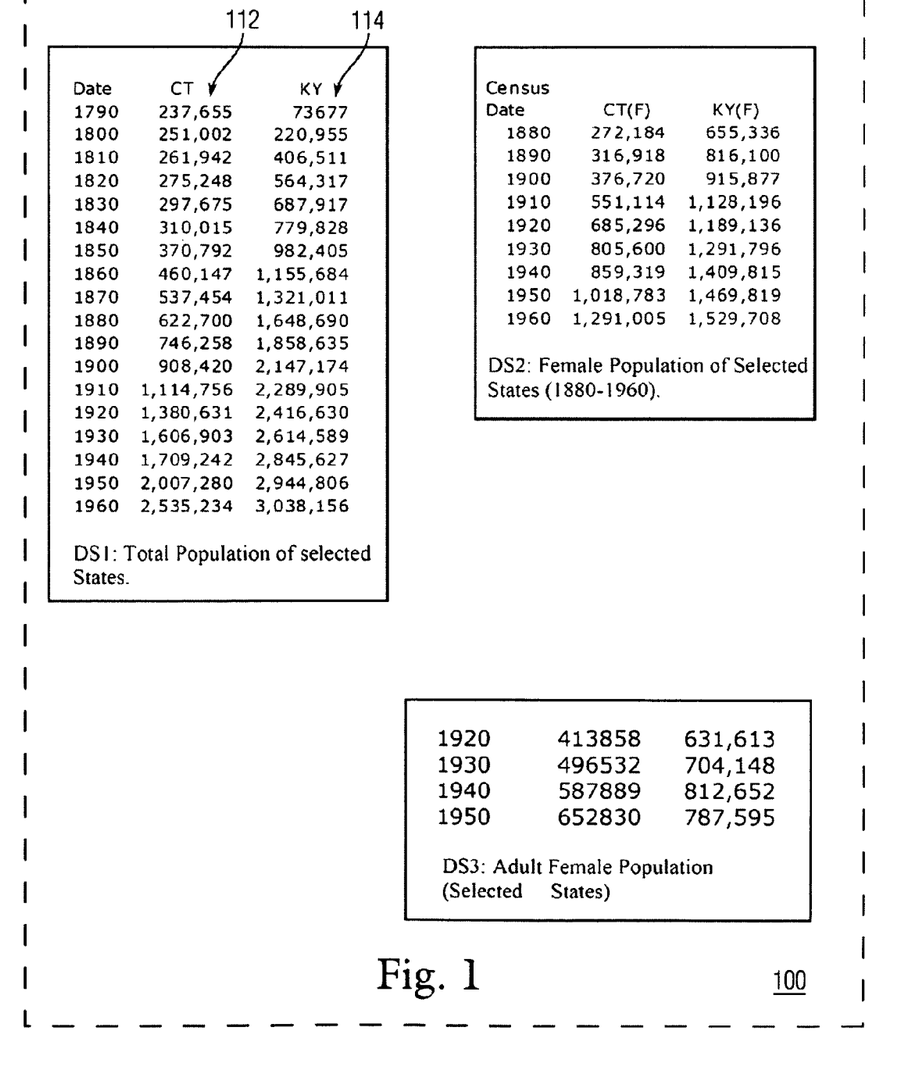
FIG. 1 illustrates an example of three sets of data stored as discrete dataset tables in a dataset container file (DCF) in accordance with the invention.

Referring now to FIG. 1, an implementation of the invention is described in connection with three example datasets, DS1, DS2 and DS3, each of which comprises a table of data. These datasets describe research by a professor who has collected data concerning certain population figures of two states, Connecticut and Kentucky. Depending on the parameter being tracked, there is different data available. While these particular datasets are fictitious, they are representative of a common situation in which the data underlying a research effort has its own limitations, notwithstanding the diligent efforts of the professor or investigator to locate relevant data. If the data are deemed useful and important, they can be included in a dataset. However, for this person's work to be continued by another investigator, the datasets have to be made available for further study. Moreover, any quirks relating to the data should be explained so that those quirks are understood by the next investigator or by a person reviewing this professor's work. Preferably, each of the datasets {DS1, DS2, . . . , DS[#n]} is stored as a separate dataset table in a common DCF 100.

The dataset can be stored internally within the DCF, and preferably the DCF is a single file. Thus, the dataset can comprise a table of records, such as in an SQL-compatible relational database or as XML encoded records. SQL records lend themselves to being queried and combined in arbitrary ways for presentation to a user. Such presentation is preferably in synchronization with commentary that provides deeper insight into the information in the dataset, and describes associations that have been made across datasets, and any quirks regarding the underlying data.

Figure 2A:
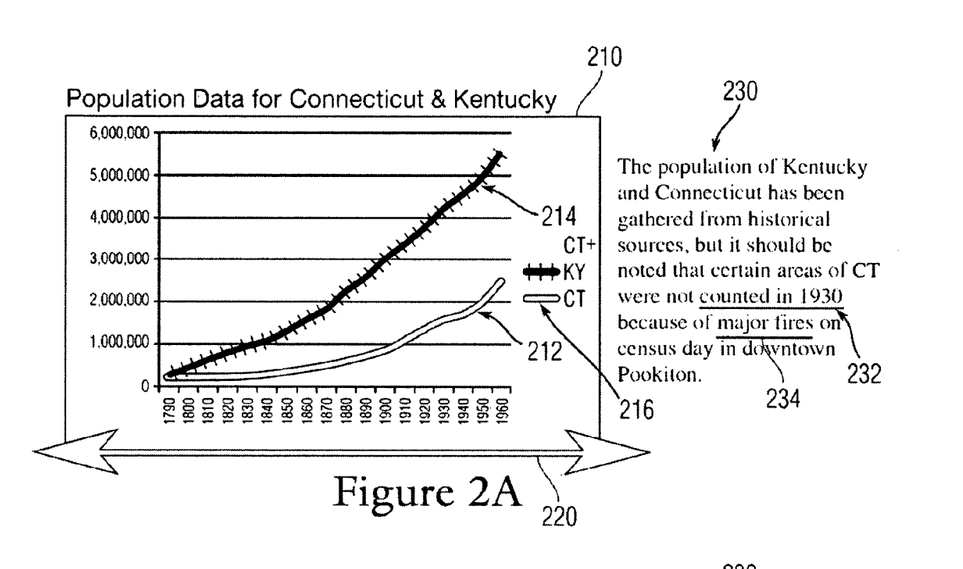
FIG. 2A is an exemplary visual presentation of the plural datasets in the DCF, including interactive elements.
Figure 2B:
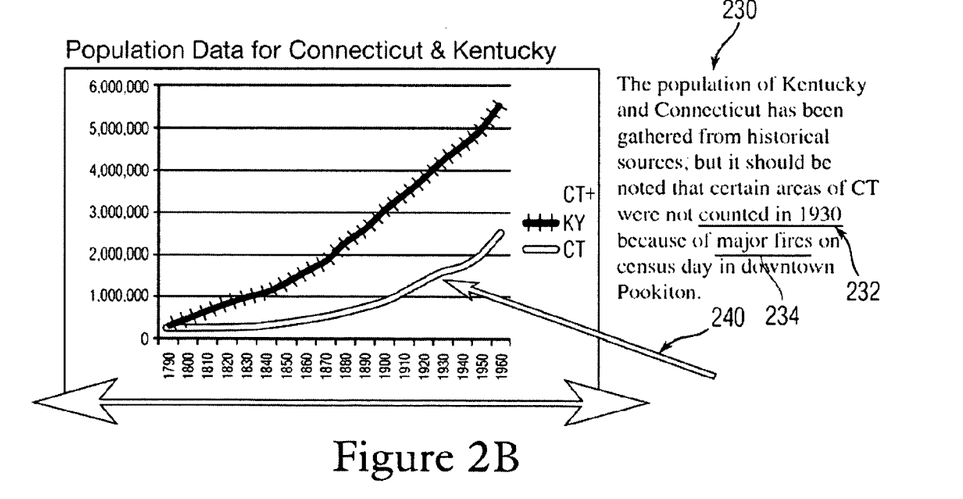
FIG. 2B is the visual presentation of FIG. 2A, showing a response to interaction with commentary presented to a reviewer.
Figure 2C:
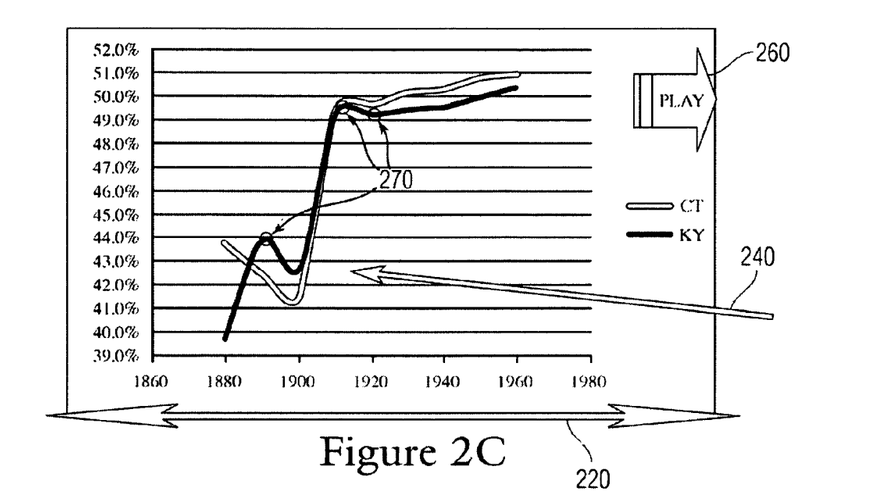
FIG. 2C is a different visual presentation of the datasets in the DCF.

Referring now to FIGS. 2A through 2C, the manner in which datasets can be visualized is described in connection with the use of several visualization tools in accordance with an embodiment of the invention. By way of background, the visualization of the dataset is preferably accomplished using an interface module 405 that provides a graphical user interface 300 in which portions or entire datasets can be selected and used to configure one or more presentation tools in a manner determined by the author. The same interface can be used by a reviewer to playback the visualizations and see the report that the author has assembled. Thus, on the one hand the user interface 300 can be used to arrange information in the dataset(s) for presentation in accordance with the researcher's requirements and desires, and on the other hand reviewers can interactively play the presentation, explore the datasets, and add commentary and additional visualizations, if the DCF creator has established such permission to any reviewers or class of reviewers. Depending on permissions that are set by the dataset author, the datasets themselves can be extracted and used by further researchers in connection with further analyses, critiques and studies.

The visualizations defined by an author follow a timeline that governs when a particular visualization is being presented, when it is not being presented, and whether other visualizations can be selected and called up by the reviewer (i.e., the person interacting with the presentation). A presentation is constructed using at least a portion of at least one of the datasets in the DCF and is played back through the user interface 300. The visualizations can be made available from, for example, a Java visualization library, though it is understood that the proposed invention can be implemented in multiple ways using a variety of programming systems.

Turning now to FIG. 2A, one part of a presentation in the user interface 300 can include a plot of a given dataset, such as DS1. DS1 is plotted in FIG. 2A so as to show the values from the table plotted as a chart 210. In particular, the column of data in DS1 relating to total population census data in Connecticut from 1790 to 1960 (see FIG. 1, column 112), is plotted as line 212. Meanwhile, the chart 210 also shows the total population of Connecticut plus that of Kentucky as line 214, using the data from FIG. 1, columns 112, and 114. A legend 216 identifies the data that is being plotted. The axes of the chart can be auto-scaled to fit the data in a conventional manner, such as by scaling in view of the largest and smallest values along each axis, and optionally on a logarithmic scale. A control 220 can expand or alter the scale along any axis.

FIGS. 2A and 2B also show text 230 in association with the graph 210 and the underlying dataset DS1. The text includes author-commentary that is obtained from the author in response to interaction with an interface 300 and this text is another part of a presentation created by the author using an editor module. The text 230 can include elements that respond to user interaction such as text 232 that calls-up a pointer 240 (see FIG. 2B) to highlight a point that the author wishes to stress in the dataset presentation in response to the user hovering (e.g., using mouseover-event detection) or clicking on (e.g., using a mouse-click event detection) the text 232. Similarly, the text 230 can include text 234 which in this example is "major fire" that similarly is configured by the author to call up other visualizations of the dataset, such as a movie clip that can be presented (using a video-insertion tool 350) to show footage of the fire referred to in the text.

Referring now to FIGS. 1 and 2C, another part of a presentation in the user interface 300 can include a plot of a portion of a dataset. In this example, the author selects DS2 (female population) and divides the entries in this dataset by the total population data in DS1 for each of the columns of data (Connecticut and Kentucky). The resulting plot can have data limited to the data range that is common to the two datasets (which in this example is census data from 1880 to 1960). In other words, the range of plotted data can be limited to the portions that have actual data. The plot of FIG. 2C can show the entire range of data in the larger dataset (DS1), and the user can interact with the control 220 to change the range, say, to only show 1880 to 1960, the range of data in DS2. With further reference to FIG. 2C, a play button 260 provides a further control that can be provided by the author to automatically advance through a portion of text and other commentary associated with the graph visualization, including arrows 240 and one or more dots 270, wherein the arrows and dots can be included in the presentation in synchronization with a position on a governing timeline that the author develops, as described below.

Figure 2D:
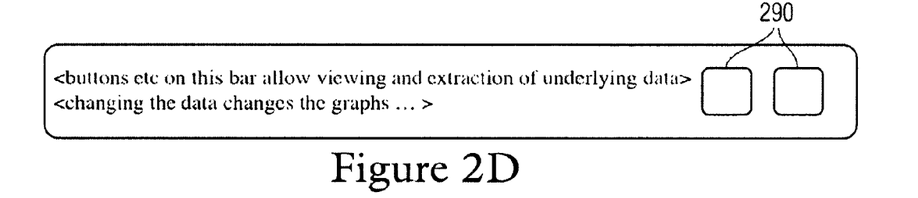
FIG. 2D illustrates controls that can be selectively presented to reviewers to permit manipulation of data in the DCF.

The data necessary to generate a plot as in FIGS. 2A, 2B and 2C can be queried from the datasets in the DCF and such queries define the parameters for the plot to be charted. As can be appreciated, if the data in the DCF is changed, such as by interacting with the controls 290 shown in FIG. 2D, the plots will reflect those changes. The data queries can comprise select statements having a format such as shown below:

Select CT from DS2/CT From DS1
where DS1:Date=DS2:Date.
Select KY from DS2/KY From DS1
where DS1:Date=DS2:Date.

Figure 3A:
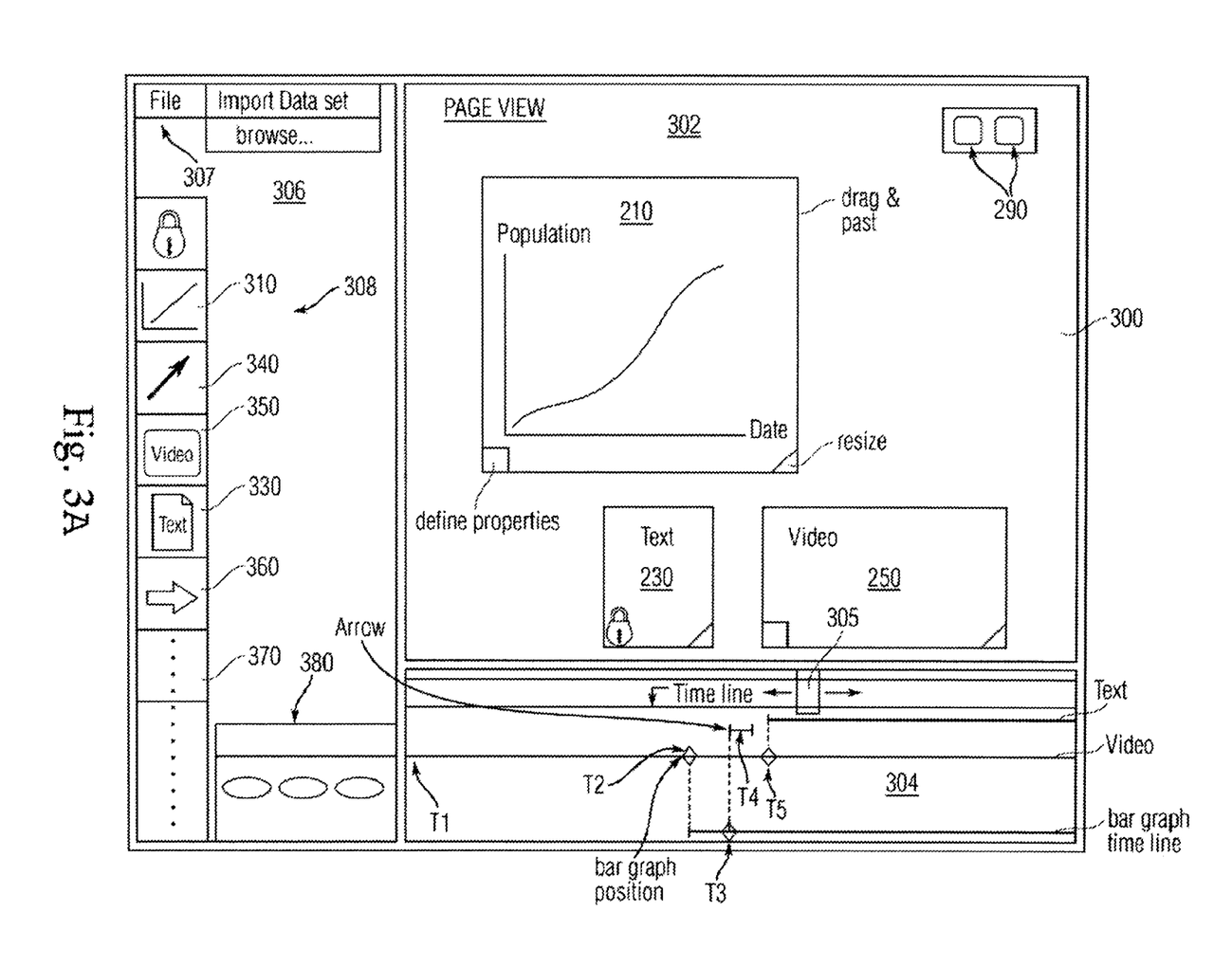
FIG. 3A is illustrates an interface presentable on a display of a computer in accordance with the embodiment of FIG. 1.
Figure 3B:
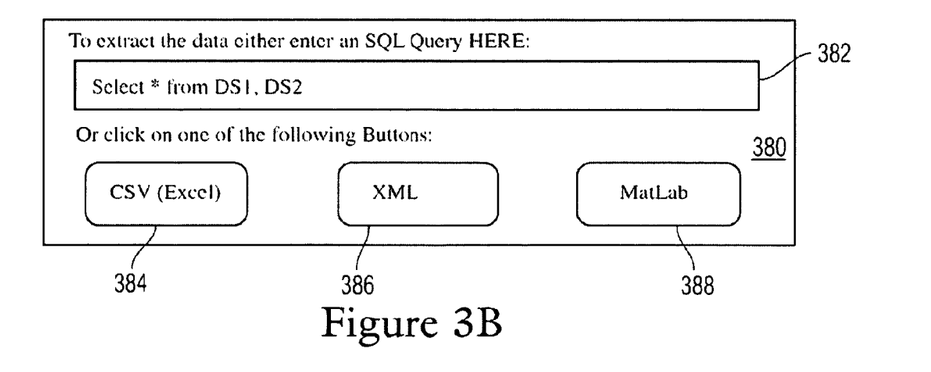
FIG. 3B is a detail view of a dataset extraction control panel of FIG. 3A.

Referring briefly to both FIGS. 3A and 3B, the "select" statements or other queries (e.g., any standard SQL database command) can be entered into a command box 382 of a dataset extraction control panel 380 in a in order to define the data to be extracted from one or more tables. Preferably, controls are provided so that the author can work with and extract data from datasets in a variety of formats, working with the data in the native format. Thus, for instance, data can be imported into the editor module with which the author is working by extracting data as a set of comma separated values from a spreadsheet such as Microsoft Excel, a product of Microsoft Corporation, Redmond, Wash. In this instance, a button 384 identifies to the editor module that data is to be imported in that format. Alternatively, a button 386 can intake data from a dataset such as one of DS1, DS2, . . . , DS[#n] in an XML format. In this instance, the XML-encoded data can carry with it functionality that can influence the way that data is presented by executing the XML code during the presentation of that data. As another alternative, data that has been processed by MatLab, a product of The MathWorks of Natick, Mass., can be pulled in using control 388. The imported data in this instance can include code suitable for performing matrix manipulation, plotting of functions and data, implementation of algorithms, and other functionality.

FIG. 3A is an example of a user interface (UI) 300 that can be presented to both a DCF author and to a reviewer. Reviewers can be given restricted or plenary author privileges, depending on the author's preference. The UI has three major sections. Section 302 is a page view section that can be implemented, for example, as a window or frame within a window. The page view section shows visualizations of datasets as may be selected by the author and arranged with associated commentary for presentation to a reviewer. Section 304 is a timeline that include various controls and position markers that define the moments that one or more visualizations are present in the page view section. Section 306 includes menus 307, palettes 308 and the dataset extraction control panel 380 that are used to by persons with author privileges to define a presentation.

Referring now to the page view 302 and the timeline 304, visualizations of the dataset appear in the page view in synchronization with defined positions along the timeline. The snapshot view in FIG. 3A is taken at a point on the timeline on or after T5 since only after this time are the text 230, video 250, and graph 210 visualizations in the page view at the same time. More particularly, at time T1, only the video 250 appears in the page view because it is defined along the timeline as spanning the entire presentation. The span of a given visualization tool is definable by the author by dragging begin and end points within the time line section 304. By clicking on a time line midpoint of one visualization, the adjacent begin-marker of another visualization can be linked to the first visualization. Thus, as shown in FIG. 3A, a bar graph visualization tool has its end marker at the end of the presentation (such that the bar graph will remain in the page view until the end of the video), and has it's begin marker aligned with T2. By clicking on the video timeline at T2, the bar graph is synchronized to that position on the video time line and, as a result, when the presentation reaches time T2 the bar graph appears in the page view. At time T3, an arrow appears on the bar chart (not shown in FIG. 3A, but see arrow 240 in FIG. 2B). The arrow disappears at time T4 and then, at time T5, text 230 appears and remains until the end of the presentation. A scroll control 305 permits the author to review the appearance of the presentation and each of the visualization tools at any point in the presentation.

The author can assign a position, size, rotational view, transparency, shading and the like in the page view 302. As an example, the arrow annotation used in FIG. 2B is an overlapping graphic with transparent background that is placed on the timeline. An editor module permits the inclusion of each visualization tool, and also provides author-controls to make such adjustments. For instance, a resize control can be grabbed and dragged to change the size of the bar graph, or the graph can be grabbed from a different edge and dragged to a different location in the page view. Similar adjustments can be made to the text 230 and video 250 visualization components. Optionally, the author can lock certain visualizations such as the text 230 (as indicated by the padlock icon) so that reviewers can access one or more of the underlying datasets, but not change the textual commentary.

The menus 307, palettes 308 and the dataset extraction control panel 380 in section 306 can be selected and dragged into the page view (which includes the visualization for the entire time line, or can be dragged into the timeline section to define a begin time for the visualization. Arbitrary combinations of data can be used to generate visualizations. The visualizations described so far are a result of interaction with these controls 310. For example, the graph control 310 provides a template graph 210. The author can define the properties of the graph to change whether it is a bar graph, line graph, pie chart, which data and datasets are to be graphed, and whether there is any interactivity and the responses to such interactivity. The arrow control 340 causes an arrow 240 to appear in a visualization in response to a temporal trigger. The video control 250 provides a widget 250 in the page view that is suitable for playing video files in any of a number of formats. The text control 330 causes a text box 230 to appear in the page view. The text box can include text, hypertext, XML, and other structures with which a reviewer can interact. A play control 360 can implement a script such as a sequence of visualizations that are defined along the timeline but not necessarily played unless and until invoked by the reviewer. This can be useful in cases in which the data is too complex to be displayed statically; instead, it can be "played" and recorded audio or video can be played in synchrony. The dot-control 370 provides embellishments to augment other visualization tools such as the graph 230, as described above in connection with FIG. 2C. The menus 307 provide further interface components such as the ability to import datasets, browse for resources available to the editor module (e.g., stored files on a network), and to save and print the DCF.

Any visualizations including commentary that is input using the editor module through the user interface 300 is saved together with the datasets DS1, DS2 and DS3 in the DCF.

Figure 4:
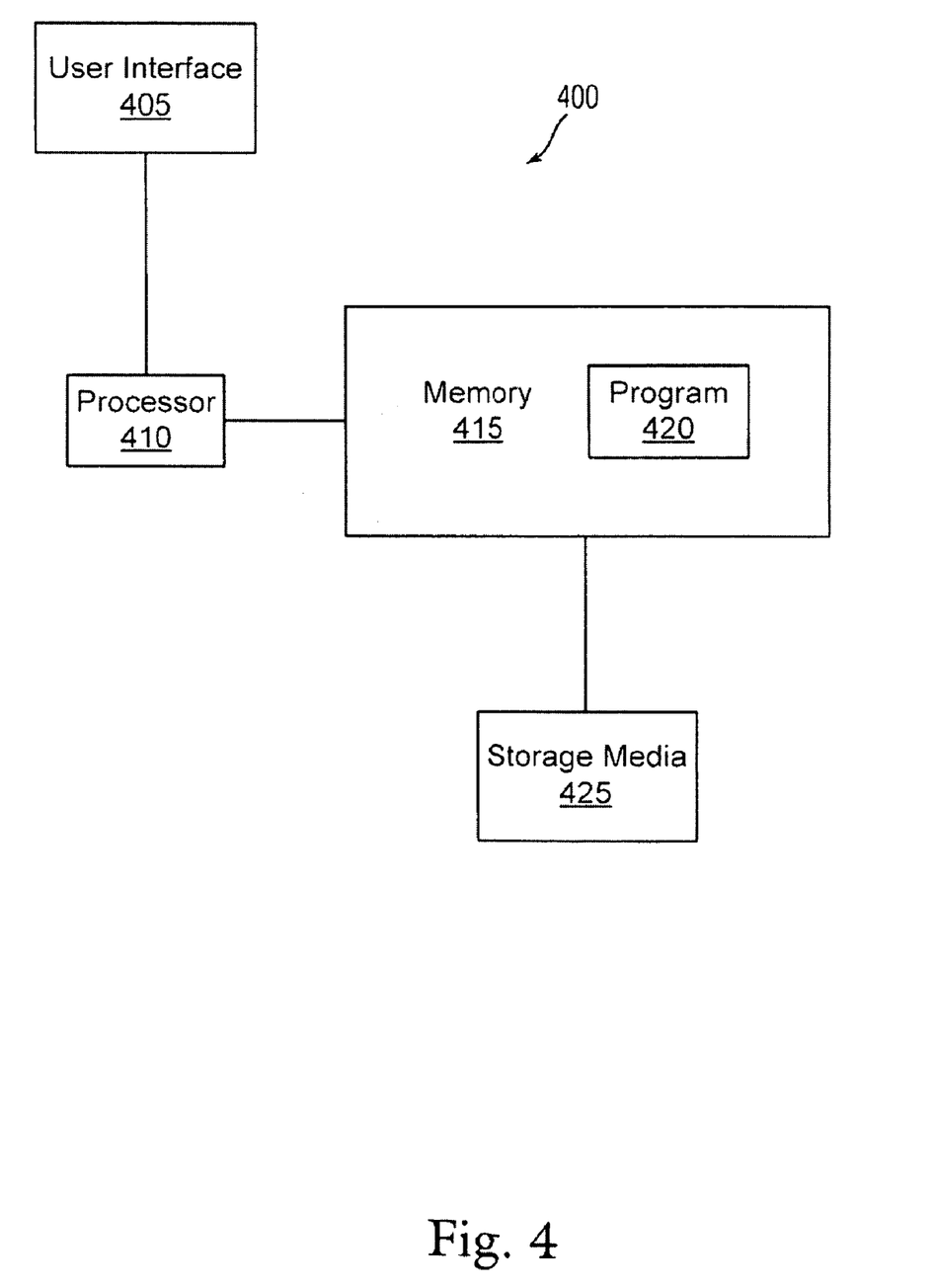
FIG. 4 is a block diagram of a computer system 400 configured for employment of method 100.

FIG. 4 is a block diagram of a computer system 400 configuration suitable for implementing a system in accordance with an embodiment of the invention. System 400 includes a user interface 405, a processor 410, and a memory 415. System 400 may be implemented on a general purpose microcomputer, such as one of the members of the Sun® Microsystems family of computer systems, one of the members of the IBM® Personal Computer family, one of the members of the Apple® Computer family, or a myriad other conventional workstation, desktop computer, laptop computer, a netbook computer, a personal digital assistant, or a smart phone. Although system 400 is represented herein as a standalone system, it is not limited to such, but instead can be coupled to other computer systems via a network (not shown).

Memory 415 is a memory for storing data and instructions suitable for controlling the operation of processor 410. An implementation of memory 415 would include a random access memory (RAM), a hard drive and a read only memory (ROM). One of the components stored in memory 415 is a program 420.

Program 420 includes instructions for controlling processor 410 to execute modules of code, as described below, that provide functionality in support of scholarly commentary and other commentary on one or more datasets. Program 420 may be implemented as a single module or, more preferably, as a plurality of modules that operate in cooperation with one another. Program 420 is contemplated as representing a software embodiment of the system described herein.

User interface 405 includes an input device, such as a keyboard, touch screen, tablet, or speech recognition subsystem, for enabling a user to communicate information and command selections to processor 410. User interface 405 also includes an output device such as a display or a printer. In the case of a touch screen, the input and output functions are provided by the same structure. A cursor control such as a mouse, trackball, or joy stick, allows the user to manipulate a cursor on the display for communicating additional information and command selections to processor 410.

While program 420 is indicated as already loaded into memory 415, it may be configured on a storage media 425 for subsequent loading into memory 415. Storage media 425 can be any conventional storage media such as a magnetic tape, an optical storage media, a compact disc, or a floppy disc. Alternatively, storage media 425 can be a random access memory, or other type of electronic storage, located on a remote storage system.

Figure 5:
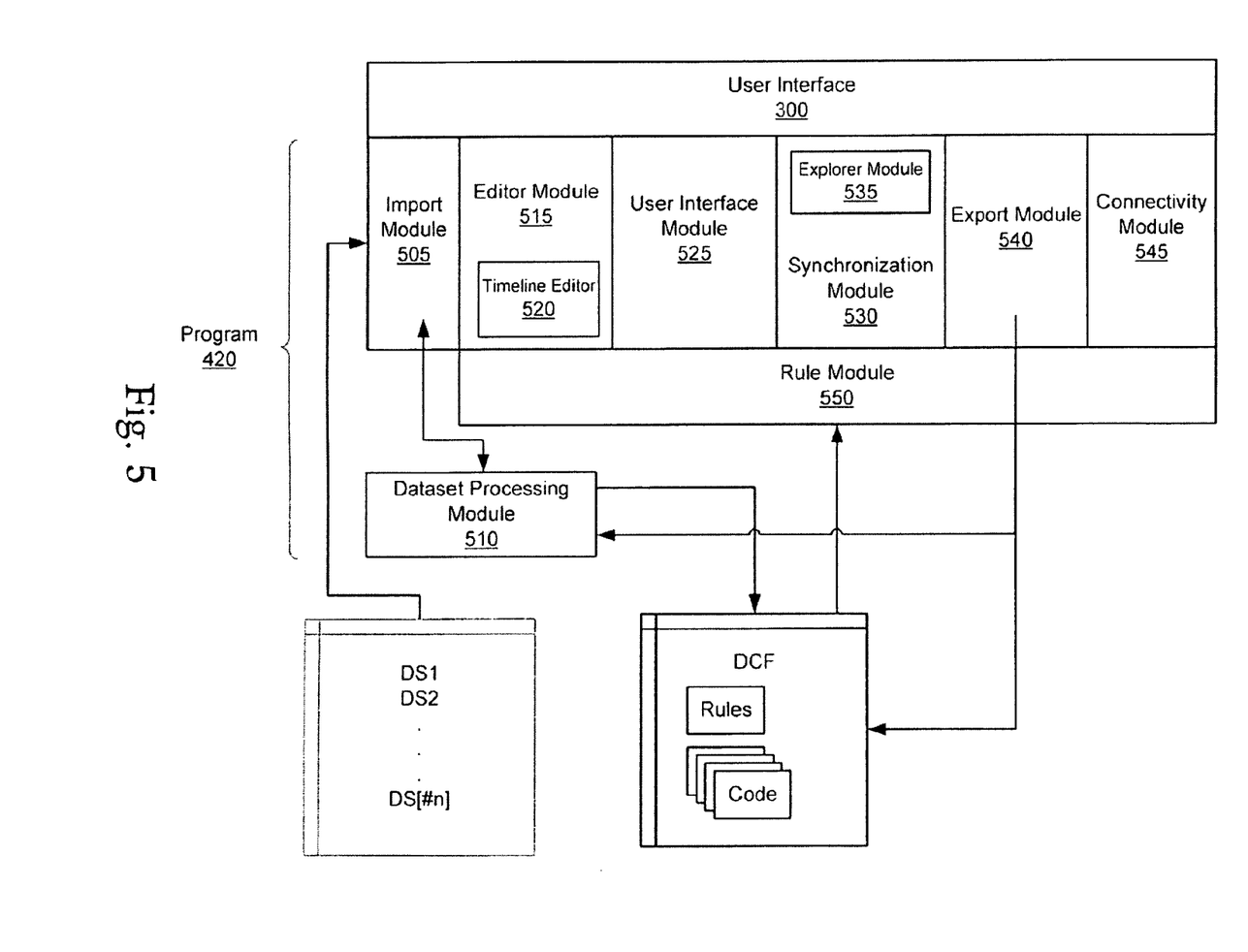
FIG. 5 is a block diagram illustrating functional modules of a system in accordance with an embodiment of the invention.

Referring now to FIG. 5, code in the form of a plurality of modules is described that operates in cooperation with one another to comprise the program 420 and provide functionality in support of scholarly commentary and other commentary on one or more datasets. The program 420 supports the functionality of the user interface 300 described above, and in particular has a number of modules or functional components that operate proactively or reactively to create and control presentations in the page view section 302.

An import module 505 is in communication with resources accessible to the computer including a data store that includes one or more datasets DS1, DS2, ..., DS[#n]. The datasets can be in any one of a variety of formats, and each dataset can be imported by the import module which executes code suitable for retrieving the contents of the identified dataset into a workspace within the memory 415. The dataset import process accepts any well-structured dataset, and the user is prompted for any additional metadata, as appropriate. The metadata will include the data type mentioned above (e.g., numerical, date, enumeration, etc.), and may optionally include units or ranges. Typically, at least one dataset that is imported comprises a tabular arrangement of data.

The program 420 can import into the DCF any dataset that can be accessed via standardized access methods such as the Open Database Connectivity (ODBC) or Java Database Connectivity (JDBC) APIs. These APIs cover the vast majority of formats in common use and are readily extensible to those not so covered. The import module 505 creates a DCF file that contains encoded versions of the original datasets. The file at this point is a valid, albeit rather uninteresting, DCF file, devoid of any commentary at this stage. It should be noted that the DCF file remembers how a dataset was imported and can export it in the same format using the export module 540.

Optionally, the dataset is retrieved into the memory 415 in its native format, that is, in a first, arbitrary format. Such a dataset can be processed by a dataset processing module 510 which includes code operative to convert the first dataset from its present format into a defined structure associated with a dataset container file (DCF) that the author is creating to contain the datasets and associated author-commentary. The DCF will include, as part of the structure that is defined by the creator or provided by default, a schema that defines the DCF in terms of any constraints on the structure and content of documents and objects of any particular type. The DCF is preferably constructed as having an XML schema.

Irrespective of how the dataset is imported, it will be stored in the DCF in a format that is compatible with operation of the DCF, including visualization, editing and export.

Once the dataset(s) is/are imported the user is presented with a blank document that can be edited to describe the dataset and add commentary. The description can include diverse objects that the creator may use to communicate to the user of the format of the dataset, the methodology used to assemble it, any idiosyncrasies that the user should be aware of, and restrictions on its use, any attributions or credits, and particular features or conclusions that the author feels are pertinent. An editor module 515 provides a selection of menus, palettes, tools and controls that the author can use, via the user interface 300, add commentary to the DCF and to input a structure for one or more datasets in the DCF. Menus, palettes, and buttons are conventional GUI objects that are available in developer toolkits of various integrated development environments and are not described further herein. The editor module includes such objects to permit the author to identify the datasets to be included in the DCF by defining the location of each dataset and the desired structure to use in the DCF. The editor module 515 associates the DCF with a particular schema, e.g., XML. The schema used can be native to the XML specification, such as the document type definition (DTD) language, or more expressive XML schema languages can be used such as XML Schema (W3C) and RELAX NG. The DCF can include text, audio images and video that are contained in the file independent of the visualizations of any of the contained datasets.

The editor module can include a timeline editor 520 or such an editor can be an independent module. In either case, the timeline editor has code in support of the controls and drag-and-drop functionality described above in connection with section 304 of the user interface 300, including the dragging of begin and end points of a given visualization in order to position media objects such as text 230 and video 250 on a timeline, and the ability to add links that join one visualization to another at a particular position along the timeline. In this way, the editor module defines the visual appearance and behavior of visualization objects, including a duration of a given object (visualization) in relation to its location on the timeline.

An interface module 525 monitors mouseover, onclick, and other events within the user interface and hands-off control to one or more other modules as a function of the detected event. For instance, if the user selects a tool, as determined by a mouseclick on one of the tools in the palette in section 306 of the user interface, then the editor module 515 is informed of the event and its code is invoked to the extent that it fulfills the author or reviewer's instruction. Through the interface module, the program 420 obtains author-commentary and associates the author-commentary with one or more of the datasets in response to such interactions. As with the datasets, any author-commentary that is created is included in the DCF.

A synchronization module 530 has code that is operative to coordinate and present a plurality of different visualizations during the course of a presentation. In particular, a portion of at least one of the datasets that has been defined as being included in the DCF is marked to a selected position on a timeline. As a result, during the presentation, author-commentary is included within the timeline at a position input by the user using the timeline editor 520 of the editor module 515. The synchronization module can be configured to access the datasets in the DCF and return a subset of the one or more datasets that are presented in one or more visual representations to the viewer on a display. The presentation of various visualizations is coordinated by the synchronization module 530 to include objects such as, but not limited to, text, images, audio, and video representations of the one or more datasets.

Optionally, an explorer module that is part of the synchronization module or independent thereof includes code that is operative to permit the author and/or reviewer to explore any visualizations on the display (e.g., a video) by zooming or panning the presentation, or by filtering data in the datasets to influence the presentation on the display. The explorer module does not modify the DCF, in distinction to editing or reviewing; rather, it is permits run-time manipulation of just the output presentation.

The program 420 further includes an export module 540 that includes code that is operative to export the datasets so that they can be utilized outside of the DCF. For instance, the export module can be invoked as a pull-down item from the menu 307 of the user interface 300. The datasets can be exported in the structure utilized by the DCF or in their native format (e.g., a first format that it had upon being imported into the program 420, either from a data store or from the dataset processing module 510).

The program 420 can also include a connectivity module 545 for communicating user-commentary to a destination. The destination is preferably identified in the DCF, for instance, by the author, and in this way, the author can control the distribution of the user commentary.

Optionally, the DCF can include a set of rules that are enforceable to who or what sites are permitted to add user-commentary or edit such commentary. Thus, the DCF can include a rule that enables the editor module 515 when the DCF is located at a prescribed site known to the DCF or when it is being acted upon by a validated user known to the DCF, or only after both of these conditions have been verified as satisfying the rules in the DCF. A rule module 550 can be used by the author, e.g., selecting from the menus 307, to obtain rule parameters that are defined by the author (DCF creator). The DCF looks like a browser-recognized file type (e.g. java) that, upon execution by a Java interpreter, will present itself in a way that captures intended appearance of the DCF, at least insofar as the browser permits. For example, the DCF can emit HTML, Javascript etc. for interpretation by conventional browser software programs such as Firefox by the Mozilla Foundation or Internet Explorer by Microsoft Corporation. Such code can be embedded as one or more modules such as described in connection with FIG. 5.

A system in accordance with a further, optional aspect of the invention has provides the author or DCF creator with the ability to lock one or more elements so as to prevent their extraction from the DCF. This permits broad distribution of commentary by the author without yielding control over the underlying datasets or visualizations that the author assembled into the DCF. For instance, one or more elements in the DCF can be digitally signed or include metadata. The digital signature identifies an authorized source of the material in the DCF. The metadata can identify any known rights in the locked (or unlocked) portion of the elements, if desired.

Referring again to FIGS. 2D and 3A, the page view 302 appears both during DCF creation and during playback. The author can set privileges for reviewers to permit access to elements in the DCF. If the reviewer is given the right to access or extract the underlying dataset(s), then controls 290 will appear in the page view and the reviewer will have access to the editor module 515 and will have a range of options in regard to manipulating the visualizations provided by the DCF and in regard to exporting datasets and other elements, subject to the settings established by the DCF creator including any rules associated with the DCF.

From the foregoing, a system for interaction with datasets in support of scholarly commentary and other commentary has been described that allows (a) embedded datasets, (b) arbitrary presentation of embedded visualizations, (c) synchronization between the embedded elements, and (d) a portable, self-synchronizing file structure that enables datasets to be: (1) self-describing, (2) discrete, archiveable objects, (c) that can be communicated across time and space with no pre-specified infrastructure other than a Java interpreter. Existing schemas such as Sophie, MatLab, XML and others can be embedded into the container file and provide their associated functionality when run in an interpreter for playback.

Several advantages result for a system as described. First, self-contained documents can have all of the "2.0" features of a web site without the website itself, so that all the decisions about how to permit commenting, tagging, editing etc can be determined and enforced at a per-document level and so can be entwined in and specific to the document (as opposed to rather generic "per site" facilities). Among other things, notes can be added in the margins, comment blocks can be included after particular paragraphs, and so on, by anyone or only particular reviewers. The system allows commentary to be crafted to the document. Next, there is a social element to document sharing that is very powerful in our culture. Other than bloggers (who are essentially broadcasting), many authors and commentators prefer to share by sending. Having possession of a document provides a moment of personal ownership to be an author, and so providing these facilities in a file can facilitate the exchange of scholarly views and workflows that without changing everyone into a blogger or a website creator. The system described herein gives rise to the idea of a new form of dataset "article" gaining widespread currency because now datasets can exist in the same file as the article itself—they can be browsed, read, analyzed and otherwise made accessible. This is all because the interpretations and commentary are bundled with the dataset(s), in an expressive and interactive environment. Finally, the datasets can be re-used because they can exist independently of the overarching work, providing scholars and others with an ability to generate additional publications from the same underlying data.

It should be understood that various combination, alternatives and modifications of the present invention could be devised by those skilled in the art. The present invention is intended to embrace all such alternatives, modifications and variances that fall within the scope of the appended claims.

I claim:

1. A system for interaction with datasets in support of scholarly commentary and other commentary, comprising a computer having a processor and a memory and a set of modules each comprising code executing in the processor, including:
    an editor module for a dataset container file (DCF) creator to create a DCF in which a location and a structure of one or more datasets is input, wherein at least one dataset comprises a tabular arrangement of data, the one or more datasets being stored in a database within the DCF;
    an import module configured to import a first dataset having a first format from the defined location;

a dataset processing module configured to convert the first dataset of the first format into the defined structure;

an interface module operative to obtain author-commentary and associate the author-commentary with the first dataset in response to interaction with a user, wherein the author-commentary is included in the DCF; and a synchronization module configured to coordinate on a display a presentation of a portion of at least one of the datasets defined in the DCF in accordance with a selected position on a timeline by querying the datasets in the DCF, returning a subset of the one or more datasets, and presenting one or more multimedia visualizations of that subset on the display, wherein the presentation includes the author-commentary within the timeline and wherein the selected position is input through the editor module, wherein the editor module is further configured to allow positioning of at least one of media objects and the visualizations on the timeline and defining the visual appearance and behavior of the visualizations the at least one of the media objects and the visualizations depicting one or more representations of the one or more datasets.

2. The system of claim 1, further comprising an export module configured to export the first dataset for use outside of the DCF.

3. The system of claim 2, wherein the export module is configured to export the first dataset in the first format.

4. The system of claim 2, wherein the export module receives the first dataset in the first format from the dataset processing module.

5. The system of claim 1, wherein the visualization module comprises a visualization library.

6. The system of claim 1, wherein the synchronization module further comprises an explorer module configured to explore the one or more datasets by one of zooming, panning or filtering the presentation on the display.

7. The system of claim 1, wherein the DCF includes code embedded therein that cooperates with an interpreter of a browser to provide an executable program after the DCF is downloaded to the browser.

8. The system of claim 1, wherein the presentation coordinated by the synchronization module includes objects depicting one or more representations of the one or more datasets, the objects selected from the group consisting of: text, images, audio, and video representations of the one or more datasets.

9. The system of claim 1, wherein the portion of at least one of the datasets comprises one or more objects depicting one or more representations of the at least one of the datasets, and wherein the interface module further comprises a timeline editor configured to associate the one or more objects with a location on the timeline.

10. The system of claim 9, wherein the timeline editor is further configured to associate the one or more objects with one another at a particular position on the timeline.

11. The system of claim 9, wherein the association is defined by dragging the one or more objects onto the timeline.

12. The system of claim 1, wherein the DCF comprises a single file comprising the one or more datasets and the author-commentary.

13. The system of claim 1, wherein the DCF further comprises one or more embedded code modules configured, when executed in a browser, to display the presentation.

14. The system of claim 1, wherein the DCF comprises plural elements and wherein at least a portion of the elements is lockable to prevent extraction from the DCF.

15. The system of claim 14, wherein at least a portion of the elements in the DCF is digitally signed.

16. The system of claim 14, wherein at least a portion of the elements in the DCF includes metadata.

17. The system of claim 16, wherein the metadata identifies any known rights in the portion of the elements.

18. The system of claim 1, wherein the DCF includes rules enforceable to restrict user-commentary or editing to particular sites to particular users, or both.

19. The system of claim 18, further comprising a rule-module configured to obtain rule parameters from the DCF creator wherein at least one of said rules is definable by the DCF creator.

20. The system of claim 1, further comprising a connectivity module for communicating user-commentary to a destination based on user-interaction with the presentation, wherein the destination is identified in the DCF.

21. A system for interaction with datasets in support of scholarly commentary and other commentary, comprising a computer having a processor and a memory and a set of modules each comprising code executing in the processor, including:

an editor module for a dataset container file (DCF) creator to create a DCF in which a location and a structure of one or more datasets is input, wherein at least one dataset comprises a tabular arrangement of data, the one or more datasets being stored in a database within the DCF;

an import module configured to import a first dataset having the defined structure from the defined location;

an interface module configured to obtain author-commentary and associate the author-commentary with the first dataset in response to interaction with a user, wherein the author-commentary is included in the DCF; and a synchronization module configured to coordinate on a display a presentation of a portion of at least one of the datasets defined in the DCF in accordance with a selected position on a timeline by querying the datasets in the DCF, returning a subset of the one or more datasets, and presenting one or more multimedia visualizations of that subset on the display, wherein the presentation includes the author-commentary within the timeline and wherein the selected position is input through the editor module, wherein the editor module is further configured to allow positioning of at least one of media objects and the visualizations on the timeline and defining the visual appearance and behavior of the visualizations, the at least one of the media objects and the visualizations depicting one or more representations of the one or more datasets.

\* \* \* \* \*